United States Patent [19]
Rath

[11] Patent Number: 4,768,910
[45] Date of Patent: Sep. 6, 1988

[54] THREADEN PIN WITH SWAGABLE COLLAR

[76] Inventor: Jack Rath, 9823 Kincardine Ave., Los Angeles, Calif. 90034

[21] Appl. No.: 846,301

[22] Filed: Mar. 31, 1986

[51] Int. Cl.⁴ .................................... F16B 19/08
[52] U.S. Cl. .................... 411/361; 10/152 R; 29/446; 29/517
[58] Field of Search ............. 411/361, 360, 39, 43, 411/70, 337, 369, 542, 430, 437, 925; 10/152 R, 153; 29/517, 446; 81/10

[56] References Cited

U.S. PATENT DOCUMENTS

| | | | |
|---|---|---|---|
| 2,632,479 | 3/1953 | Pfeil | 411/437 X |
| 3,203,300 | 8/1965 | Marschner | 411/361 |
| 3,290,982 | 12/1966 | Marschner | 411/361 X |
| 3,335,598 | 8/1967 | Jessen | 29/517 |
| 3,464,306 | 9/1969 | Reynolds | 411/361 |
| 3,464,472 | 9/1969 | Reynolds | 411/361 X |
| 3,743,334 | 7/1973 | Witsenhausen-Adelman | 29/517 X |
| 4,208,943 | 6/1980 | Smith | 411/361 |
| 4,342,529 | 8/1982 | Smith | 411/361 |
| 4,472,095 | 9/1984 | Molina | 411/430 X |
| 4,531,871 | 7/1985 | Sigmund | 411/361 |

FOREIGN PATENT DOCUMENTS

| | | | |
|---|---|---|---|
| 683295 | 3/1964 | Canada | 411/43 |
| 725903 | 1/1966 | Canada | 411/43 |
| 862436 | 2/1971 | Canada | 411/437 |
| 2317736 | 11/1973 | Fed. Rep. of Germany | 411/437 |
| 2813749 | 10/1978 | Fed. Rep. of Germany | 411/437 |
| 22402 | 8/1957 | German Democratic Rep. | 411/437 |

Primary Examiner—Lloyd A. Gall
Attorney, Agent, or Firm—Christie, Parker & Hale

[57] ABSTRACT

A swagable collar has longitudinally extending internal ribs in its bore that when the collar is swaged over a threaded pin dam a potential leak path between the thread flanks and along the root of the thread and increase the lock between the collar and the pin. The ribs extend at least two thread pitch lengths.

12 Claims, 1 Drawing Sheet

THREADEN PIN WITH SWAGABLE COLLAR

BACKGROUND OF THE INVENTION

The present invention relates to fasteners in general and, more in particular, to fasteners that use swagable collars to lock pins and collars together in fastening workpieces.

Fastener systems that use a pin and swagable collar have been known for a long time. In general, the pin of such a system has a head that bears on one side of two or more workpieces, a shank that extends through the workpieces, and annular or helical locking grooves on the side of the workpieces opposite the head. The pin may be further classified as a pull type or stump type. For the pull type, an installation tool swages the collar over the locking grooves while pulling on the pin so that collar material flows into the locking grooves to axially interfere with the pin and lock the pin, collar and workpieces together in a joint. While the installation tool pulls on the pin, it also forces the collar to bear against the workpieces to cooperate with the head in compressively loading the workpieces. The joint continues to enjoy this compressive load throughout its life. Except for the pulling on the pin, stump type pins are set the same way.

It has also been known for some time to use helically grooved or threaded pins with swaged collars to fasten workpieces together in the manner just described. Alternately, a standard nut and bolt fastener system can use the threaded pin as the bolt. The threaded pins used with a swaged collar or in a threaded fastener system makes the pin versatile.

The root of the helical groove between the flanks of the thread on the pin is a leak path whether the pin is used with a swaged collar or a threaded collar, and this has long been recognized as a disadvantage of a threaded pin. When swaged, the collar material does not reach to the root of the helical groove.

SUMMARY OF THE INVENTION

The present invention provides an effective swagable collar for use in a fastening system of a threaded pin and collar that blocks any leak path along the helical root of the thread with material from longitudinal ribs or fins of the collar.

In one form, the present invention contemplates a swagable collar of the type used with pins in general, whether pull, stump, or threaded, but which in use with the latter produces a leak proof joint blocking the leak path along the root of the thread. The collar is generally right cylindrical with a longitudinal bore through it. It may have en enlarged diameter at one end to lower the stress applied to a workpiece. At least one longitudinal rib extends axially along the wall of the bore so that with swaging over the thread of the pin, the rib moves into the root of the thread to bridge and fill the groove between the thread flanks from root to crest to interdict any leak path along the groove.

Preferably, the collar has three ribs so that the ribs center the collar on the pin before swaging the collar. Preferably, the ribs extend at least two pitch lengths so that the ribs always dam the groove regardless of the position of the collar on the pin when swaged. A truncated "V" in cross-section shaped rib with its apex facing the bore works well because the thread can pierce the rib while the rib fills the groove between the thread. To reach the thread root, the height of the rib need not equal the root-to-crest height of the thread; in one sucessfully tested collar and pin combination, the height of the rib to the thread root-to-crest height was about 70%. The rib height can be more or less in relation to thread height, but if it is as high as the thread height it will reach the root even though collar material outwardly of the rib does not penetrate in to the groove.

In a particular form, the collar has an axial counterbore at each end. The ribs extend the length of the collar bore and terminate at the counterbore at chamfered faces. The collar has three 120° spaced-apart ribs. Each rib has a truncated "V"-shaped cross-section with the apex of the truncated "V" facing the axis of the bore and the height of the rib being about 70% of the root-to-crest height of the thread over which the collar is swaged.

The invention contemplates both the collar as such and the collar in combination with the pin.

The collar effectively dams the helical leak path along the root of the threaded pin. It does so simply, expediently and inexpensively, without affecting swaging tools or the quality of the joint produced by swaging the collar over the pin. The rib also increases resistance of the swaged collar to removal from the pin. As such, it provides greater locking integrity, vibration endurance and added fatigue life.

These and other features, aspects and advantages of the present invention will become more apparent from the following description, appended claims, and drawings.

DESCRIPTION OF THE PREFERRED EMBODIMENTS

Figure 1:
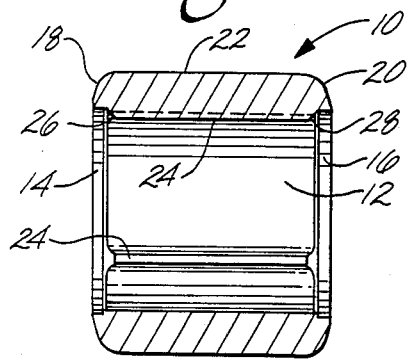
FIG. 1 shows a preferred form of the collar of the present invention in a cross-section in a plane containing the longitudinal axis of the collar.
Figure 2:
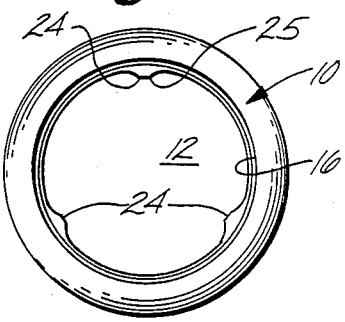
FIG. 2 shows the collar of FIG. 1 in end elevation.

FIGS. 1 and 2 illustrate a collar 10 in accordance with the preferred construction of the present invention. In general, the collar has an axial bore 12 extending from end-to-end. The bore ends in counterbores 14 and 16 resulting from the manufacture of the collar, which is preferably by extrusion; the counterbores can be eliminated by manufacturing the collar by a heading procedure. The external surface of the collar includes external chamfers 18 and 20 at the end of the collar and a right cylindrical section 22 that dominates the length of the collar. The collar is made of a standard material such as aluminum alloys, titanium alloys and other swagable materials, and may be heat treated and passivated in a standard manner.

Three longitudinally extending fins or ribs 24 extend the length of bore 12. Each rib has a truncated "V"-shaped cross-section, as can be seen in FIG. 2. In greater particular, each rib in cross-section has concave outward sides that would converge at a cusp except for the truncation; each rib is symmetrical about a bisecting radius: the sides converge towards each other in the direction of the bore axis. The truncated inner end of each rib defines a flat 25 having a cylindrical surface with a center of curvature concentric with the axis of the collar and that extends the length of the rib. This flat surface corresponds to the apex of the "V" and faces the longitudinal axis of the collar. End faces 26 and 28 of the ribs are chamfered and meet the counterbores at the end of the collar. Ribs 24 are arrayed 120° apart around the circumference of bore 12. While shown with an axial orientation, the ribs can have a helical orientation.

The three array rib construction centers the collar on a cooperating threaded fastener so that swaging forces result in symmetrical collar deformation into locking grooves or threads of a cooperating pin to produce a joint. The height of the ribs is sufficient such that upon swaging the rib engages the root of the pin thread. As measured along a radius a rib height equal to about 0.7 of the thread root-to-crest height performs satisfactorily. Depending on such factors as materials and thread specification, the rib height could be more or less than the 0.7 value. Ribs with large heights relative to the root-to-crest thread heights offer greater assurance that the helical groove between thread flanks will fill with rib material upon swaging. On the other hand, large rib heights space the body of the collar farther away from the threads than do small rib heights and the amount of collar swaging necessary to produce a satisfactory lock increases. In general, then, rib heights preferably are lower than thread root-to-crest heights but not so low that satisfactory groove filling does not occur; at present the preferred ratio is about 0.7 as mentioned. The flat at the inner end of each rib tends to produce a thicker dam at the thread root than does a rib that comes to a point, and the flat is preferred for that reason. The length of the ribs is at least two pitch lengths so that the position of the collar with respect to the threads assures the spanning at least once of the thread groove to be dammed.

The collar can have a flange at the end of it that engages the workpiece to decrease the unit load applied to the workpiece. The collar can also have an external configuration that admits to wrenching so that the collar can be tightened after swaging or removed.

The pins can be pull type, stump type, or threaded; the threaded pins can be of the pull type or the more traditional type.

Figure 3:
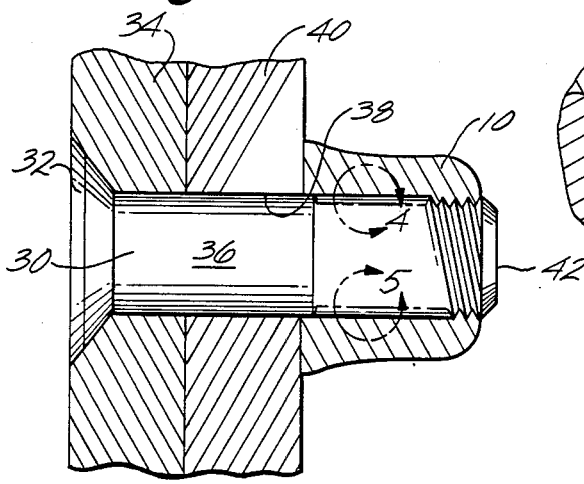
FIG. 3 shows the collar of FIGS. 1 and 2 swaged over a cooperating pin to produce a joint of the collar, pin and a pair of sheets or workpieces.
Figure 4:
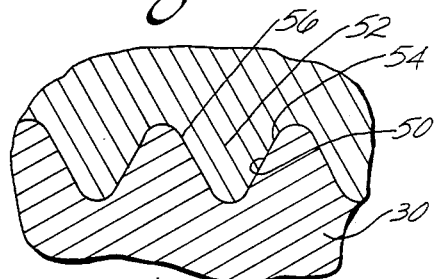
FIG. 4 is an enlarged fragmentary sectional view taken in the area 4—4 of FIG. 3.
Figure 5:
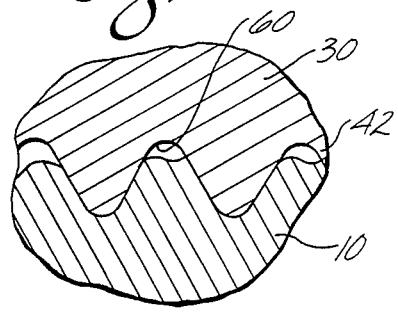
FIG. 5 is an enlarged fragmentary sectional view taken in the area 5—5 of FIG. 3.

FIGS. 3, 4 and 5 illustrate the cooperation of the collar and a threaded pin. In FIG. 3, a standard flush head, threaded pin 30 has a head 32 in a prepared seat in a workpiece 34. A shank 36 extends through a hole 38 in workpiece 34 and a second workpiece 40. The shank extends out the opposite side of the hole to meet a thread 42 of the pin. Collar 10 has been swaged over the thread 42 in a standard manner. As such the base of the collar flares out adjacent sheet 40, and the collar takes a bell shape. Swaging occurs by a swaging tool that moves along the collar axially toward the workpieces to effect collar deformation radially inward into the threads and axially against worksheet 40. The resultant joint has head 32 and collar 10 applying a compressive load onto sheets 34 and 40.

FIG. 4 shows the seal produced by a rib after swaging. In FIG. 4, the collar material behind the rib and the rib have been deformed in the swaging process so that the rib extends into a helical groove 50 of the thread of the pin and defines undulations 52 that mate with the thread and fill the groove between thread flanks 54 and 56 of the pin. The rib interdicts a leak path along the groove. Material of the rib displaced axially by the thread during swaging flows into the groove; this material supplements the rib material directly displaced into the groove from positions radially of it.

FIG. 5 shows the problem of a leak path that would result from a swaged collar onto a thread of a pin without ribs. FIG. 5 shows a typical configuration of collar 10 and pin 30 after swaging of the pin over thread 42 in a place where there are no ribs. Collar material tries to fill the helical groove between the thread flanks but fails to do so, leaving a path 60 at the root of thread 42 that except for the dams produced by the ribs would result in a helical leak path for liquid or gas to excape from one side of the joint of FIG. 3 to the other.

Figure 6:
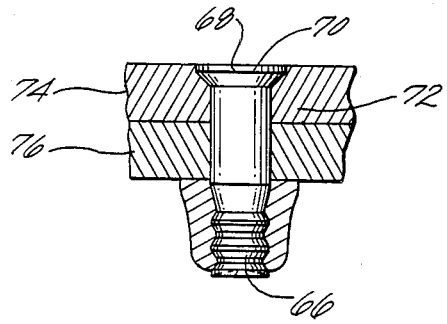
FIG. 6 is a view, partly in half-section, of the collar swaged over a stump-type pin to produce a joint of the pin, collar and a pair of sheets or workpieces.

FIG. 6 shows the collar used with a stump-type pin. The utility of the collar of the present invention in interdicting a leak path along a thread is not used with a number of pins but the collar itself can be used with such a pin without loss or compromise of its effectiveness. As a consequence, the collar has flexibility for use with different types of pin and collar systems. In FIG. 6, collar 10 has been swaged over locking grooves 66 of a stump-type pin 68. The pin has a head 70 and a shank 72. The resulting joint includes swaged collar 10, stump-type pin 68, and a pair of sheets 74 and 76 held together by the fastener system of the pin and swaged collar.

The ribs in the collar can be produced in a broaching operation that broaches the bore of the collar leaving the ribs. The collar with ribs can be produced by heading methods. As brought out previously, the collar can be made of a number of materials, for example an aluminum alloy material such as 7050 aluminum, and the collar can be heat treated or passivated as required.

The best sealing occurs adjacent the sheet against which the collar bears. Accordingly, ribs should be in this area. Preferably the ribs extend for a number of thread pitch lengths to multiply the number of dams. It is also preferred to have the ribs extend the length of the collar in the manner of FIG. 1 so that the collar is symmetrical about a plane normal to the axis of the collar that cuts the collar in two.

A cursory test of a collar swaged over the threads of a pin to form a joint in accordance with the present invention with kerosene and one side of the joint and with an external pressure applied onto the kerosene of 10 p.s.i. resulted in an effective seal after 200 hours, with no evidence of a leak. A joint produced by the same threaded pin and collar but without the ribs and under the same 10 p.s.i. of kerosene leaked in 15 minutes.

The present invention has been described with reference to a preferred embodiment. The spirit and scope of the appended claims should not, however, necessarily be limited to the foregoing description.

I claim:

1. An improvement in the combination of a swagable collar and a pin with a helical thread, the collar being of the type used with pins having at least one annular groove that material of the collar is swaged into to develop an axial lock between the pin and collar, the collar having a longitudinal bore through it, the improvement comprising:

at least one continuous and uninterrupted longitudinal rib along the wall of the bore and extending radially inward toward the axis of the bore and that upon swaging the collar onto the threaded pin deforms and bridges and fills the groove between thread flanks from root-to-crest to effect a dam that interdicts any leak path along the groove, the longitudinal length of the rib being at least a multiple of two of the thread pitch length.

2. The improvement claimed in claim 1 wherein there are at least three of the ribs arrayed along the wall of the bore to center the collar on the pin.

3. The improvement claimed in claim 1 wherein the rib has a generally truncated "V"-shaped cross-section with the truncated end of the rib facing the axis of the bore.

4. The improvement claimed in claim 1 wherein the radial height of the rib is at least equal to about 0.7 of the depth of the groove between root and crest.

5. The improvement claimed in claim 1 wherein the collar has an axial counterbore at each end, is symmetrical about a bisecting plane normal to the longitudinal axis, and the leading edges of the rib have chamfers.

6. The improvement claimed in claim 5 wherein there are at least three of the ribs arrayed at about 120° intervals around the wall of the bore.

7. The improvement claimed in claim 6 wherein each of the ribs has a generally truncated "V"-shaped cross-section with the truncated end of the rib facing the axis of the bore.

8. The improvement claimed in claim 7 wherein the radial height of the rib is at least equal to about 0.7 of the groove depth between thread root and thread crest.

9. The improvement claimed in claim 1 wherein each of the ribs extend at least from about one end of the collar.

10. The improvement claimed in claim 9 wherein each of the ribs has a generally truncated "V"-shaped cross-section with the truncated end of the rib facing the axis of the bore, and the height of each rib is at least equal to the depth of the thread between root and crest.

11. The improvement claimed in claim 10 wherein each rib in cross-section has concave outward sides converging toward each other moving along a radius towards the axis of the bore.

12. The improvement claimed in claim 11 wherein the collar has an axial counterbore at each end, is symmetrical about a bisecting plane normal to the longitudinal axis, and the leading edges of the ribs have chamfers.

* * * * *